United States Patent
Parent et al.

(10) Patent No.: US 6,654,482 B1
(45) Date of Patent: Nov. 25, 2003

(54) METHOD AND DEVICE FOR LOCATING AND GUIDING A MOBILE UNIT EQUIPPED WITH A LINEAR CAMERA

(76) Inventors: Michel Parent, 7, boulevard de la Reine, F 78000 Versailles (FR); David Gualino, 21, rue Charles de Gaulle, F 78860 Saint Nom la Breteche (FR)

( * ) Notice: Subject to any disclaimer, the term of this patent is extended or adjusted under 35 U.S.C. 154(b) by 0 days.

(21) Appl. No.: 09/530,655
(22) PCT Filed: Oct. 6, 1998
(86) PCT No.: PCT/FR98/02129
§ 371 (c)(1), (2), (4) Date: May 3, 2000
(87) PCT Pub. No.: WO99/23543
PCT Pub. Date: May 14, 1999

(30) Foreign Application Priority Data

Nov. 4, 1997 (FR) .......................................... 97 13849

(51) Int. Cl.⁷ ................................................ G06K 9/00
(52) U.S. Cl. ..................................................... 382/104
(58) Field of Search .......................... 382/104; 701/23, 701/207; 235/384; 348/148

(56) References Cited

U.S. PATENT DOCUMENTS

| | | | | |
|---|---|---|---|---|
| 5,440,109 A | * | 8/1995 | Hering et al. | ................ 235/384 |
| 5,555,312 A | | 9/1996 | Shima et al. | ................ 382/104 |
| 5,922,036 A | * | 7/1999 | Yasui et al. | .................... 701/28 |

FOREIGN PATENT DOCUMENTS

| EP | 0 720 075 A2 | 3/1996 | ............ G05D/1/02 |
|---|---|---|---|
| EP | 0 725 326 A2 | 8/1996 | ............ G05D/1/02 |

OTHER PUBLICATIONS

Behringer et al., "Simultaneous Estimation of Pitch Angle and Lane Width from the Video Image of a Marked Road", Proceedings of the IEEE/RSJ/GI International Conference on Intellig Robots and Systems: Advanced Robotics and the Real World, Munich, Sep. 12–16, 1994, vol. 2, Sep. 12, 1994, Institute of Electrical and Electronics Engineers.

Negishi et al., "Automatic Tracking of Highway Road Edge Based on Vehicle Dynamics", Systems and Computers in Japan, vol. 26, No. 6 (Jun. 1, 1995).

* cited by examiner

*Primary Examiner*—Leo Boudreau
*Assistant Examiner*—Tom Y. Lu
(74) *Attorney, Agent, or Firm*—Connolly Bove Lodge & Hutz LLP (57) ABSTRACT

The method for locating a mobile unit relatively to an intermittent lighted beacon consists in calculating, on the basis of data concerning the mobile movement, the position of the discrete scatterer on the linear barrette obtained by a point by point subtraction of two linear images of the same image field, one wherein the beacon is alight and one wherein it is not alight, and the derivative of the position. On the basis of said data, the distance separating the beacon thus represented and a mark related to the mobile unit is calculated, and the beacon angular position relative to said mark linked with the mobile.

13 Claims, 8 Drawing Sheets

METHOD AND DEVICE FOR LOCATING AND GUIDING A MOBILE UNIT EQUIPPED WITH A LINEAR CAMERA

FIELD OF THE INVENTION

The present invention relates to the location and guidance of a moving body equipped with a linear camera.

It finds one application in the location and/or guidance of a motor vehicle driving along a roadway along which fixed beacons are distributed which define a reference path, the beacons being intermittently illuminated either actively (intermittently emitting sources) or passively (retroreflective beacons illuminated by a flash).

BACKGROUND OF THE INVENTION

A number of techniques for locating and guiding motor vehicles are already known.

One of these techniques, known as the "wire guidance" system consists in continuously slaving the motor vehicle to a conductive wire embedded in the ground and powered at a chosen frequency.

Another known technique consists in slaving the motor vehicle to magnetic markers, embedded in the ground. One or more detectors on board the vehicle detect the presence of the markers as the vehicle passes over said markers, and thus allow the vehicle to be located with respect to the markers.

Yet another known technique consists in providing wire guidance along a radiating cable laid along the roadway along which the vehicle moves. A sensor on board the vehicle determines the distance between the cable and the vehicle. Slaving keeps this distance at a constant value.

Such techniques have the disadvantage of requiring infrastructures which are generally expensive to implement both in the ground and in the vehicle. Furthermore, these techniques provide information only along that portion of the route which is in the immediate vicinity of the vehicle. As a result, this information does not allow the path along the road to be predicted, and this prevents the next said path being used to regulate the speed of the vehicle.

Another known technique uses image processing to locate a moving body with respect to visible points of reference on the roadway, such as white lines. However, this technique is not satisfactory either, because of poor marking (old white lines, roadworks, puddles, reflections from the sun) which perturb the image processing.

BRIEF SUMMARY OF THE INVENTION

The present invention provides a solution to the problems discussed above.

It sets out from a method for locating a moving body equipped with a camera of the type comprising a linear array of photosensitive elements, aimed in a known direction with respect to reference axes associated with the moving body, image processing means, and means for capturing information relating to the movement of the moving body.

According to a general definition of the invention, the method involves the steps consisting in:

a) distributing in the zone in which the moving body moves, fixed beacons which are intermittently illuminated either actively and/or passively, b) at the moving body and at a chosen rate, taking a pair of different linear images of the same image field, one of the images being one in which the beacon or beacons are illuminated, the other being one in which the beacon or beacons are not illuminated, c) processing the pair of linear images by a point-by-point subtraction of one from the other, d) obtaining at least one bright spot from the subtraction of the two linear images, this spot representing at least one light beacon in the environment, e) calculating, on the basis of information relating to the movement of the moving body, the position of the bright spot on the linear array, and its derivative, a first item of information relating to the distance separating the beacon thus represented and a frame of reference associated with the moving body, and a second item of information relating to the angular position of the beacon with respect to said frame of reference associated with the moving body, thus making it possible, as a function of the first and second items of information thus calculated, to locate the moving body in relative terms with respect to said beacon.

According to a first embodiment of the invention, step e) further comprises locating the moving body in absolute terms with respect to a fixed frame of reference associated with two separate beacons which can be seen simultaneously, said absolute location consisting in calculating, at a single given instant, a relative location with respect to each beacon as described hereinabove, the heading of the moving body with respect to the two beacons, and the coordinates of a chosen point of the moving body with respect to said fixed frame of reference associated with the two beacons.

According to a second embodiment of the invention, step e) further comprises locating the moving body in absolute terms with respect to a fixed frame of reference associated with two beacons which can be seen at least in turn as the moving body moves along, said absolute location consisting in calculating, at a first given instant, a first relative location with respect to a first beacon as described hereinabove, in calculating, at a second given instant, after the first instant, in calculating [sic] a second relative location of the moving body with respect to a second beacon which follows the first beacon in the direction of travel of the moving body, as described hereinabove, in using odometry to calculate the movement of the moving body and the heading of the moving body with respect to said first and second beacons and in calculating the coordinates of a chosen point of the moving body with respect to said fixed frame of reference.

Advantageously, the number of beacons are distributed along the roadway to define a reference path, and the method further comprises a step f) which consists in determining said reference path using the relative and/or absolute location of the moving body as described hereinabove, and in guiding the moving body, keeping a certain distance between the moving body and said reference path. A method such as this allows the moving body to predict the path along the route so as, for example, to regulate the speed of the moving body.

Another subject of the present invention is a device for implementing the method according to the invention.

BRIEF DESCRIPTION OF THE DRAWINGS

Further features and advantages of the invention will become clear from reading the detailed description hereinafter and from the drawings, in which.

DETAILED DESCRIPTION OF THE INVENTION

Figure 1:
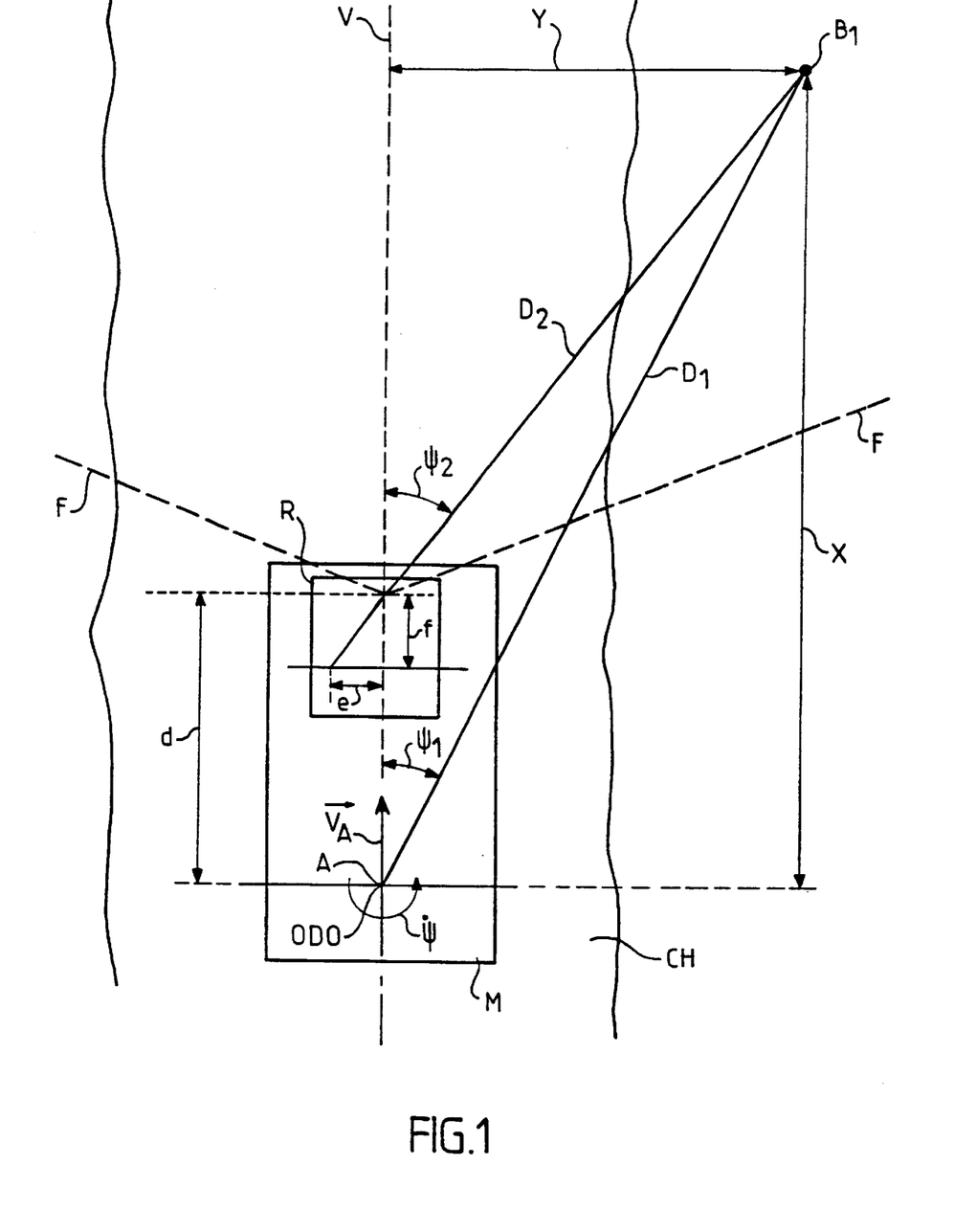
FIG. 1 diagrammatically depicts a moving body such as a motor vehicle taking pictures of its environment which, in particular, contains a beacon.

In FIG. 1, a moving body such as a motor vehicle M moves along a roadway CH, along which at least one beacon B1 is placed. The moving body carries identification equipment comprising a camera and, if appropriate, a flash that will be described in further detail hereafter. The camera takes pictures of its environment in a field F with a line of sight V.

The environment of the moving body comprises a series of beacons such as B1 capable of emitting or reflecting light, advantageously of the infrared IR type so as not to distract other motorists, intermittently toward the moving body M.

In a first embodiment, the beacons may themselves be active intermittent IR light-emitting sources, equipped with self-contained power supplies or alternatively powered from the mains.

In a preferred alternative form, the moving body M is equipped with a flash which illuminates the zone of sight of the identification equipment with infrared light at a chosen rate. The beacons are then passive and consist simply of reflectors, such as catadioptric reflectors. For example, the moving body is itself autonomous, that is to say, on the one hand, self-propelled and, on the other hand, capable of operating on automatic pilot or providing assistance for lateral guidance as will be described in greater detail hereinafter.

The identification device is, for example, fixed inside the cabin of the vehicle, near the driver's interior rear-view mirror. The camera may be aimed approximately downward, for example at an angle of about 5° to the horizontal plane.

The line of sight V of the identification equipment is aimed in a known direction with respect to reference axes associated with the moving body. In what follows, it is assumed that this direction is fixed, aimed toward the front of the moving body.

In the known way, the vehicle comprises means of capturing information relating to the movement of the moving body, for example information of the odometric type. For example, encoders ODO are placed on the non-driving wheels of the vehicle (in this instance, the point A of the vehicle with reference to FIG. 1 corresponds to the center of the rear axle of the moving body). Calculation means (not depicted) on board the vehicle are capable, with good accuracy by virtue of a Kalman filter, for example, of calculating the linear speed Va, and the angular velocity of the mid-point A of the rear axle of the vehicle using these odometric encoders. Alternatively, a rate gyro can be used to calculate the angular velocity of the vehicle.

Figure 2:
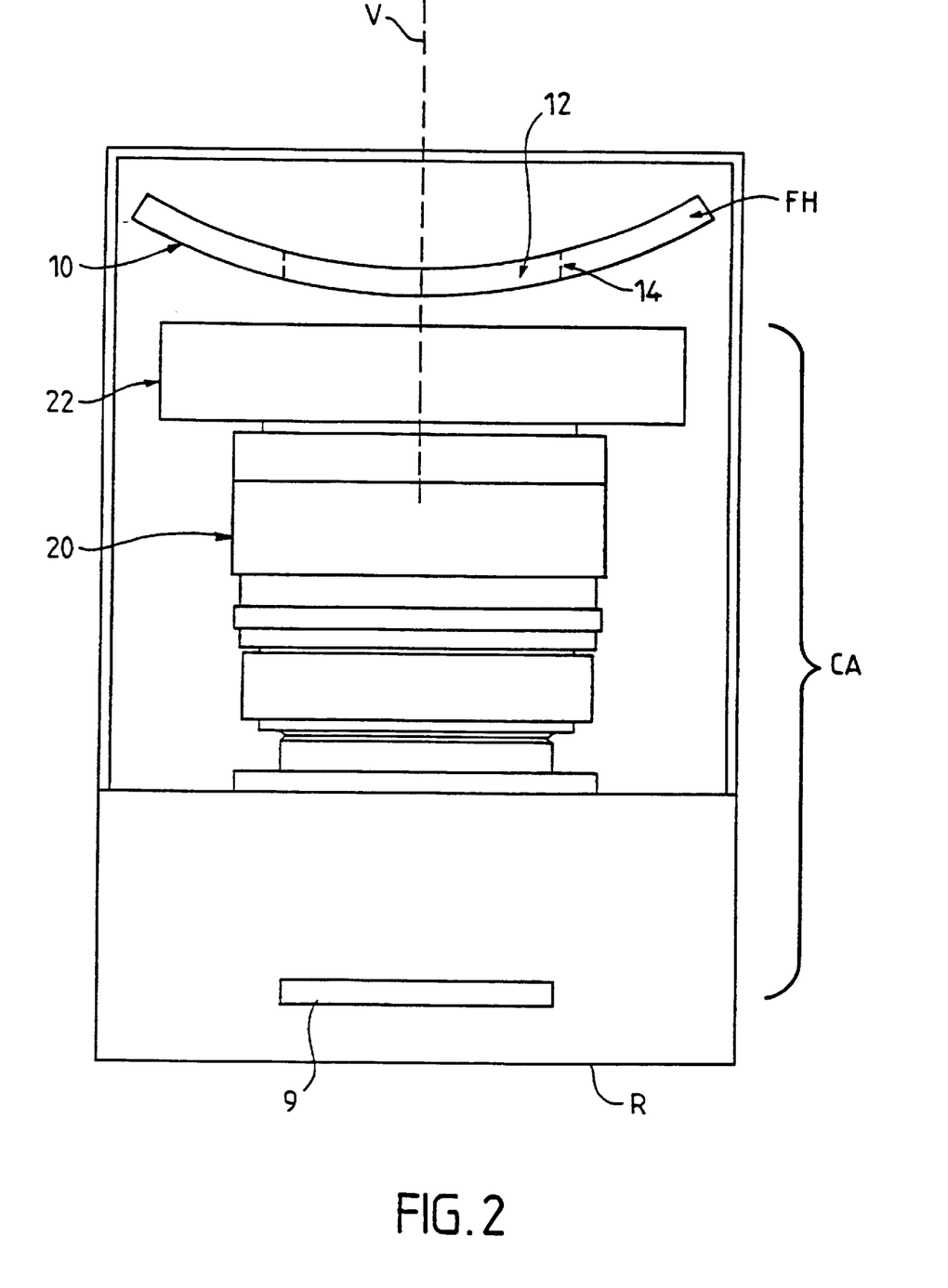
FIG. 2 diagrammatically depicts the essential and constituent means of the linear camera and of the flash according to the invention.
Figure 3:
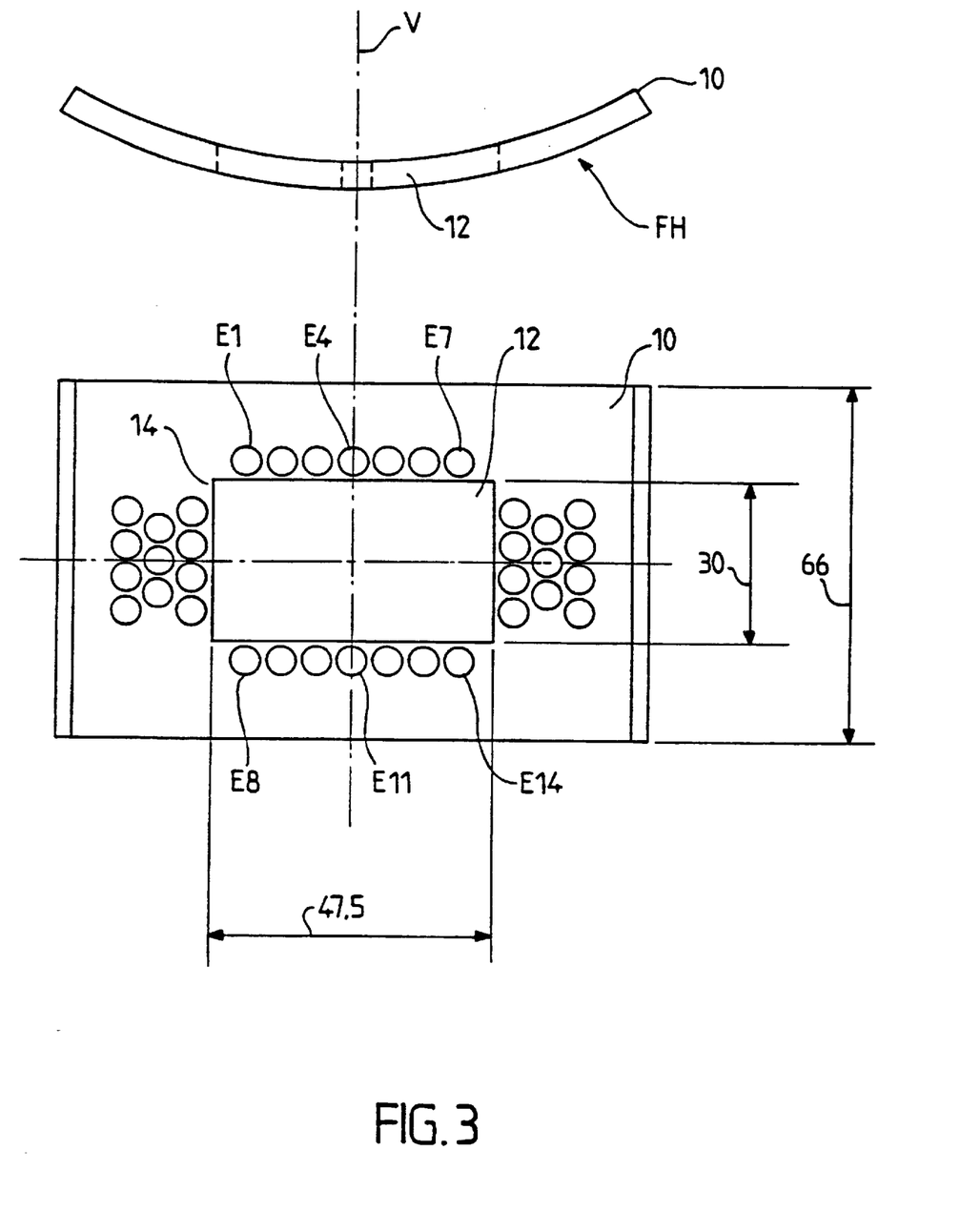
FIG. 3 is a front-on view of the camera support which comprises light-emitting diodes arranged around the objective lens of the camera according to the invention, so as to create a flash.

With reference to FIGS. 2 and 3, the identification equipment R comprises a flash FH aimed in the same direction as the camera CA. The flash FH is placed on a support 10 which has an opening 12 through which the light beams can pass.

Arranged around the periphery 14 of the opening 12 are a number of light-emitting diodes E capable of operating with infrared light.

For example, the opening 12 is of parallelepipedal shape and the support 10 is of concave shape with a concavity of a few degrees. The dimensions of the opening 12 are 47.5 mm and 30 mm, for example.

A chosen distance away from the edge of the opening, for example 1 mm away, are rows of light-emitting diodes. For example a row of 7 diodes is arranged along each long side of the opening, these being labeled individually as E1 to E7 along the first long side and E8 to E14 along the second long side. The diodes E4 and E11 are aligned with the field of sight V.

There is a row of 4 diodes along each short side of the opening. Advantageously, other parallel rows of 3 or 4 diodes are arranged along the short sides of the opening. Quite obviously, the distribution of the diodes could differ from the one described with reference to FIG. 3, according to the desired radiation pattern. Thus, if there were a desire to illuminate one verge of the road more than the other, more diodes could be placed on one of the sides of the opening 12.

The camera CA comprises a linear array 9, for example of 2048 photoelements of the CCD type. The length of the array 9 is 30 millimeters. This is arranged horizontally along a straight line perpendicular to the axis of travel of the vehicle. In addition to the array, the camera comprises a spherical lens 20 of the type used in photographic apparatus with a focal length of 28 mm, and a cylindrical lens 22 with a focal length f of about 100 millimeters, and a horizontal generatrix.

Finally, the optical assembly is supplemented by a filter (not depicted) which allows only infrared radiation to pass.

The camera may be aimed approximately downward, for example at an angle of a few degrees to the horizontal plane. The field of view of the camera is thus about a few degrees (10° for example) in the vertical plane, and about 60° in the horizontal plane.

It should be pointed out that the cylindrical lens 22 makes it possible to observe the projection in the horizontal plane of the beacons located in the field of view regardless of their position in the vertical plane.

The optical assembly has been optimized for a distance of about 15 meters.

The camera is connected to processing means on board the vehicle which process the information from the camera and from the odometric information capture means.

According to the invention, two linear images IL1 and IL2 of the same image field are taken at a chosen rate (for example 1000 Hz). The first image IL1 (FIG. 4A) is obtained without flash, (or alternatively when the beacon or beacons are not illuminated in the case of actively-emitting beacons), possibly in the presence of sunlight.

Figure 4A:
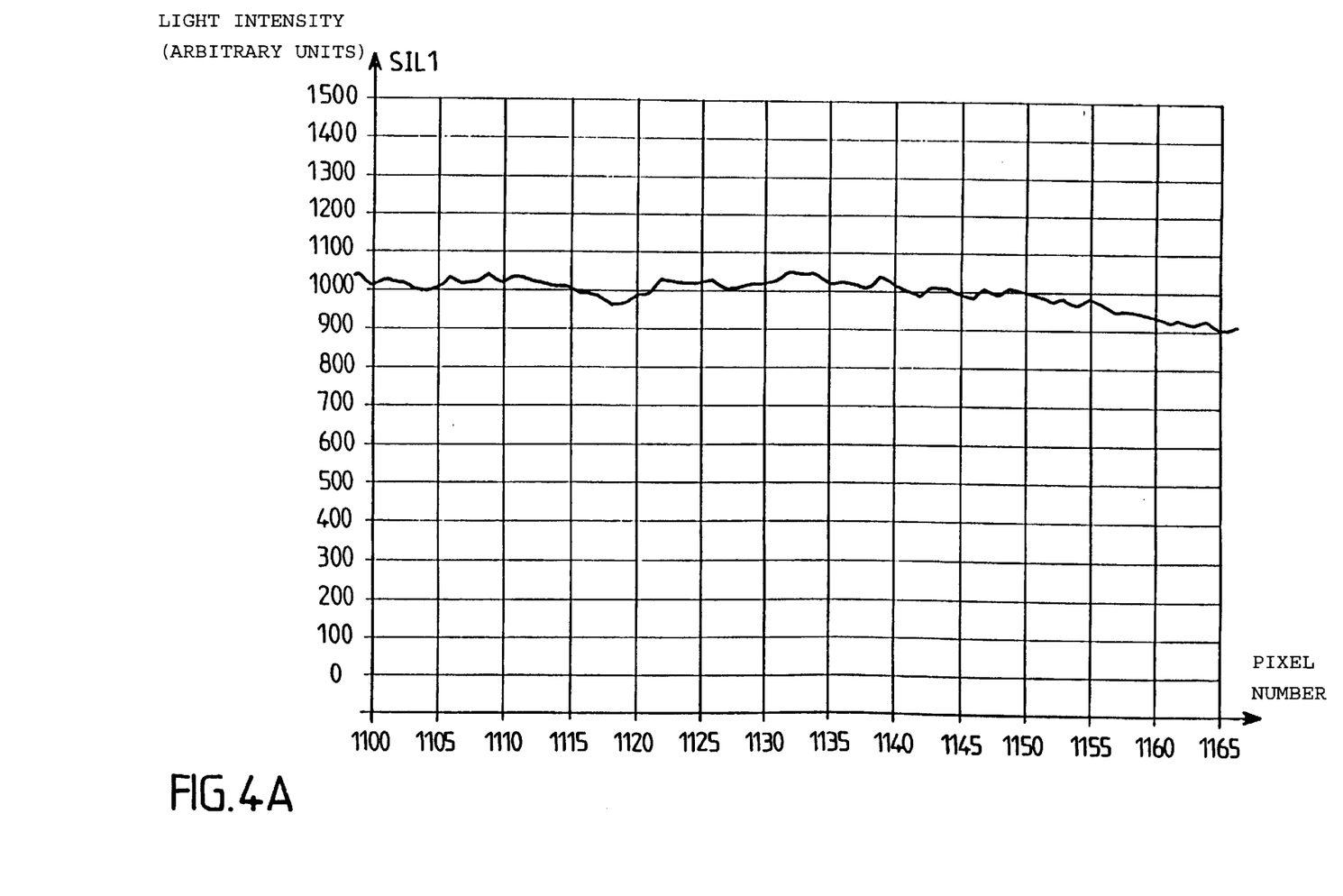
FIGS. 4A to 4C illustrate the obtaining of two linear images of the same image field, one without flash and the other with flash, and the point-by-point subtraction to locate a light beacon on the linear array.

The signal SIL1 corresponds to the value of light intensity of the 2048 pixels of the linear camera. For example, the value of the light intensity of the pixels of the linear camera is coded on 12 bits, that is to say from 0 to 4096 in arbitrary units. With reference to FIG. 4A, the background noise has an intensity of the order of 1000 for pixels from 1100 to 1170.

Figure 4B:
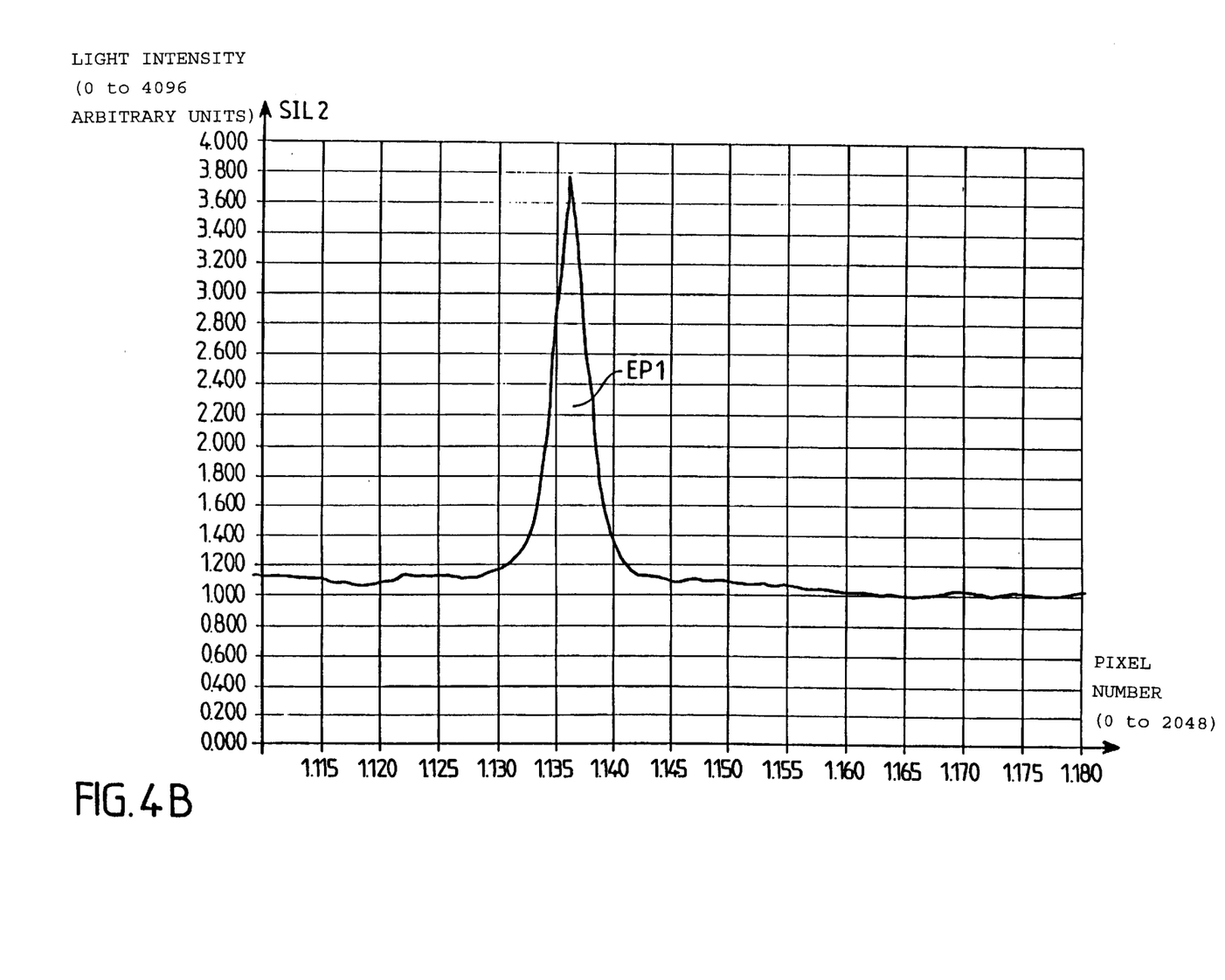

The second image IL2 (FIG. 4B) is obtained with flash (or alternatively when the beacon or beacons are illuminated in the case of actively illuminated beacons). With reference to FIG. 4B, the high-intensity pixels form a spike EP1 representing the light beacon and the base of the spike EP1 has a non-zero intensity because of the continuous background noise.

Figure 4C:
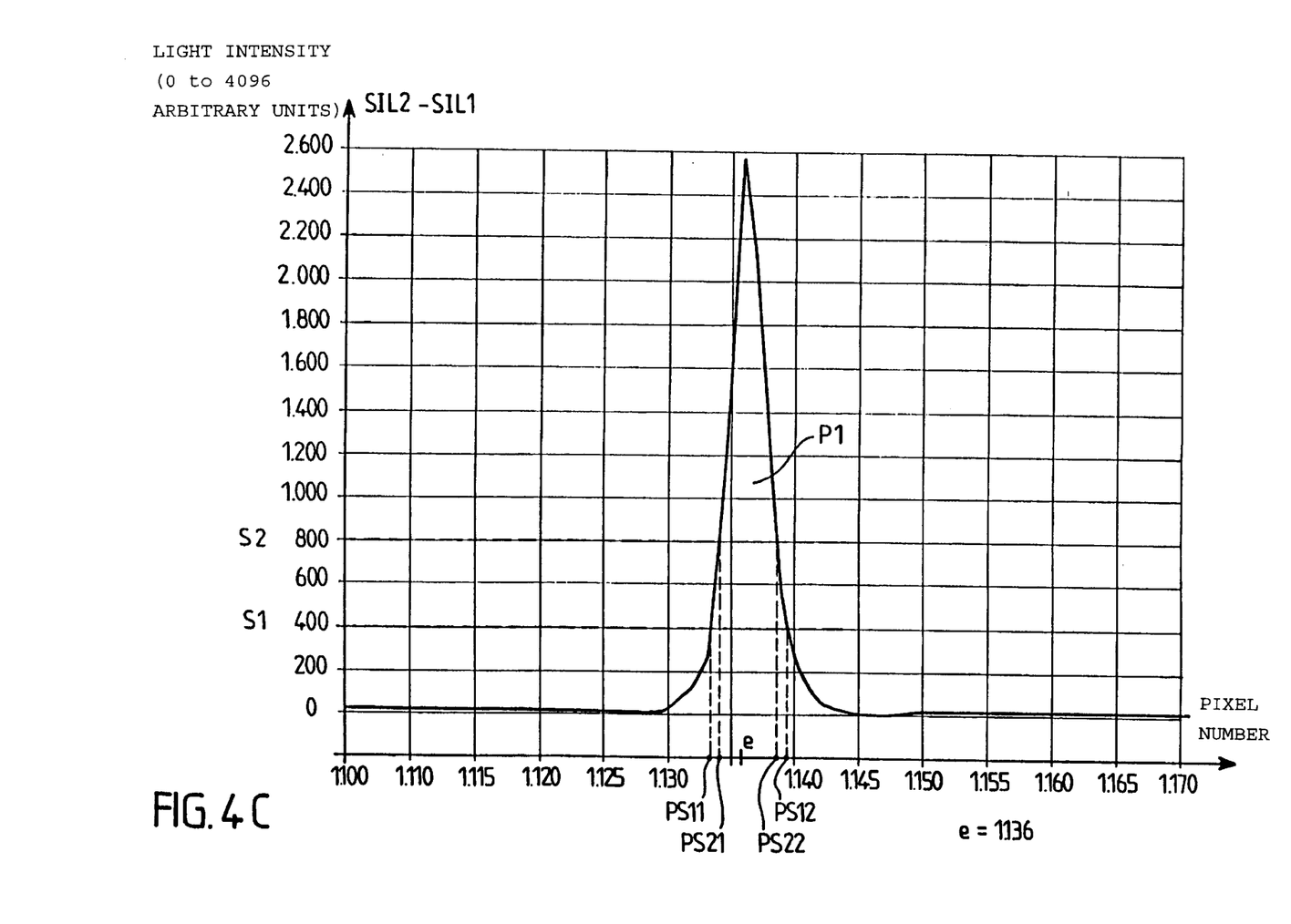

Point-by-point subtraction of the images IL1 and IL2 one from the other makes it possible to obtain at least one collection of bright spots P1, reliably and without background noise. With reference to FIG. 4C, the central position e of the set of bright spots P1 is calculated on the basis of thresholds S1 and S2 established for the intensity of the signal corresponding to the subtracting of the two images IL1 and IL2. For example, the threshold S1 is at 400 and the threshold S2 is at 800. The central position e is, for example, deduced from the mean of all of the points P1 which in this instance corresponds to the center of the points PS11 and PS12 in the case of the threshold S1 and the center of the points PS21 and PS22 in the case of the threshold S2.

The central position e on the linear array (for example e is equal to 1136 on a scale of 2048 pixels) represents the light beacon B1 in the environment of the moving body as described with reference to FIG. 1.

On the basis of information relating to the movement of the moving body (for example odometric information), the position e of the bright spot or spots P1 on the linear array and the derivative ė of said position e, the calculation means will determine the distance D1 separating the beacon B1 and a frame of reference associated with the moving body. In practice, the frame of reference associated with the moving body has as its point of origin the point A described with reference to FIG. 1.

The calculation means will also use the above information to determine the angular position $\psi_1$ of the beacon B1 with respect to said frame of reference A associated with the moving body.

This information D1 and tan $\psi_1$ is resolved using the appended formulae I and II, with the aid of known parameters which are:

e: position of the bright spot P1 on the array;

Va: linear speed of the moving body (odometric quantity);

f: focal length of the camera;

d: distance between the mid-point A of the rear axle and the linear array;

$\dot{\psi}_1$: derivative of the angular position, or angular velocity (odometric quantity)

ė: derivative of e.

At the end of the calculation, the moving body is located in relative terms with respect to the beacon B1.

A number of beacons may be distributed along the roadway to define a reference path. The method according to the invention then consists is determining the reference path defined by the beacons by locating the moving body using the relative location described hereinabove. Next, the calculation means can maintain a certain distance between the moving body and said reference path thus determined.

A method such as this allows the moving body to predict the path along the route so as, for example, to regulate the speed of the vehicle. It also allows the moving body to be given lateral guidance with respect to the reference path.

As a preference, the beacons are distributed in such a way that the moving body sees at least two of them at every point of its movement (beacons distributed every 5 m for example).

To allow the vehicle to operate on "automatic pilot" according to the invention, the vehicle has to have the possibility of having its drive, braking and steering controlled electronically.

For example, these electronic controls come from an on-board microcomputer device (not depicted) capable of operating braking, steering and drive actuators.

It may also be necessary to locate the moving body in absolute terms with respect to a fixed frame of reference defined by one or more beacons.

Figure 5:
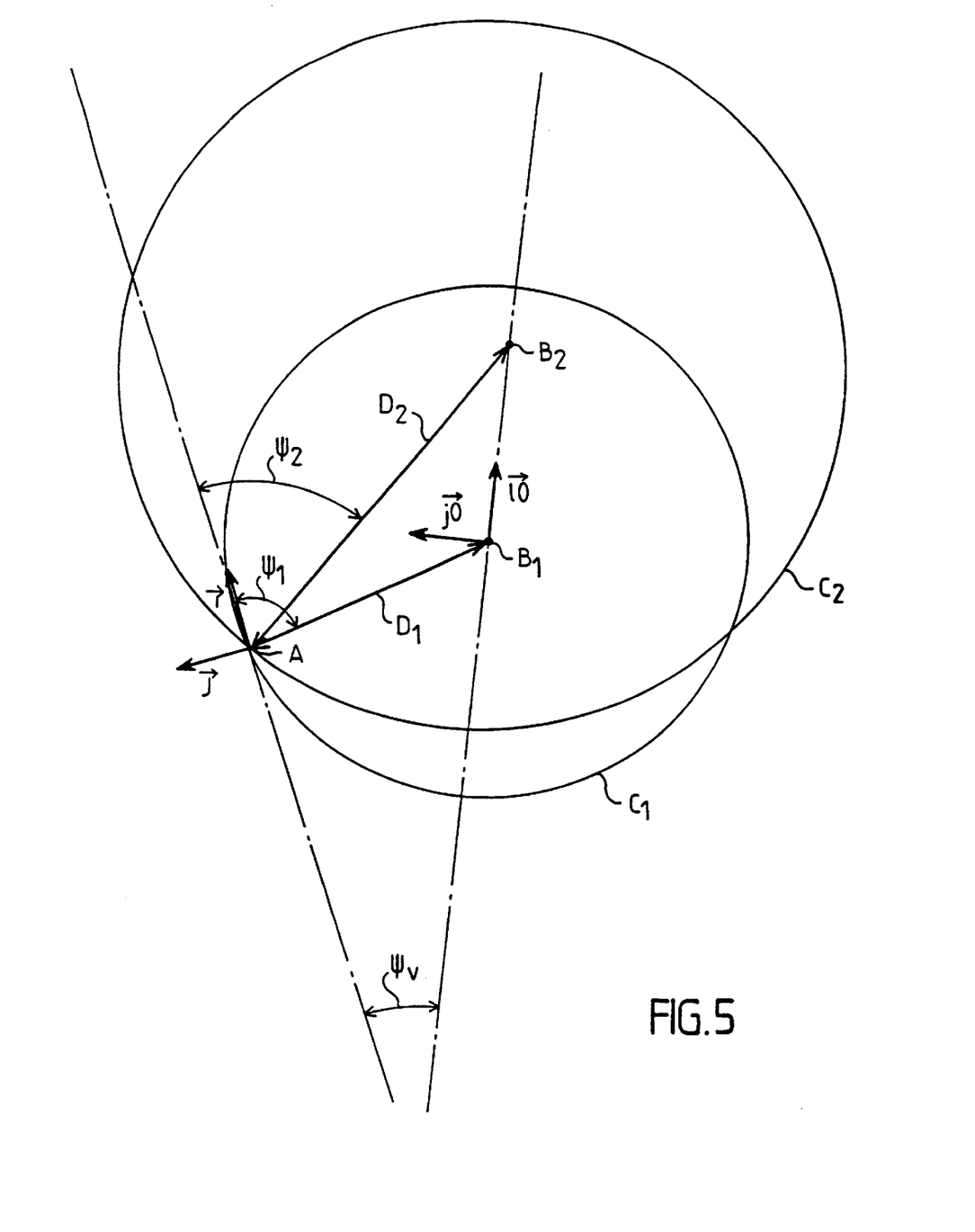
FIG. 5 illustrates a first method of locating the moving body in absolute terms, which is performed at a given instant with respect to two separate beacons which can be seen simultaneously according to the invention.

With reference to FIG. 5, absolute location is achieved using two beacons B1 and B2 which can be seen simultaneously and which define a fixed frame of reference R0, with respect to the moving body. In this frame of reference R0, the beacon B1 has the coordinates 0,0, the beacon B2 has the coordinates $X_{B2}$, 0 and the point A has the coordinates $X_A$, $Y_A$.

The heading of the vehicle tan$\psi_V$, is defined according to the appended formulae III and IV using parameters (calculated as described with reference to FIG. 1) and which are:

D1: distance between point A and the beacon B1;

D2: distance between point A and the beacon B2;

$\psi_1$: angular position of point A with respect to B1; and $\psi_2$: angular position of point A with respect to B2.

The coordinates of point A are defined by the intersection of the circles C1 and C2 centered respectively on B1 and B2 and with the respective radii D1 and D2 according to formulae V and VI.

The coordinates of the vehicle $X_A$ and $Y_A$ are determined according to formulae VII and VIII.

Absolute location is achieved here at a single given instant with respect to the beacons B1 and B2 seen simultaneously by the camera.

Figure 6:
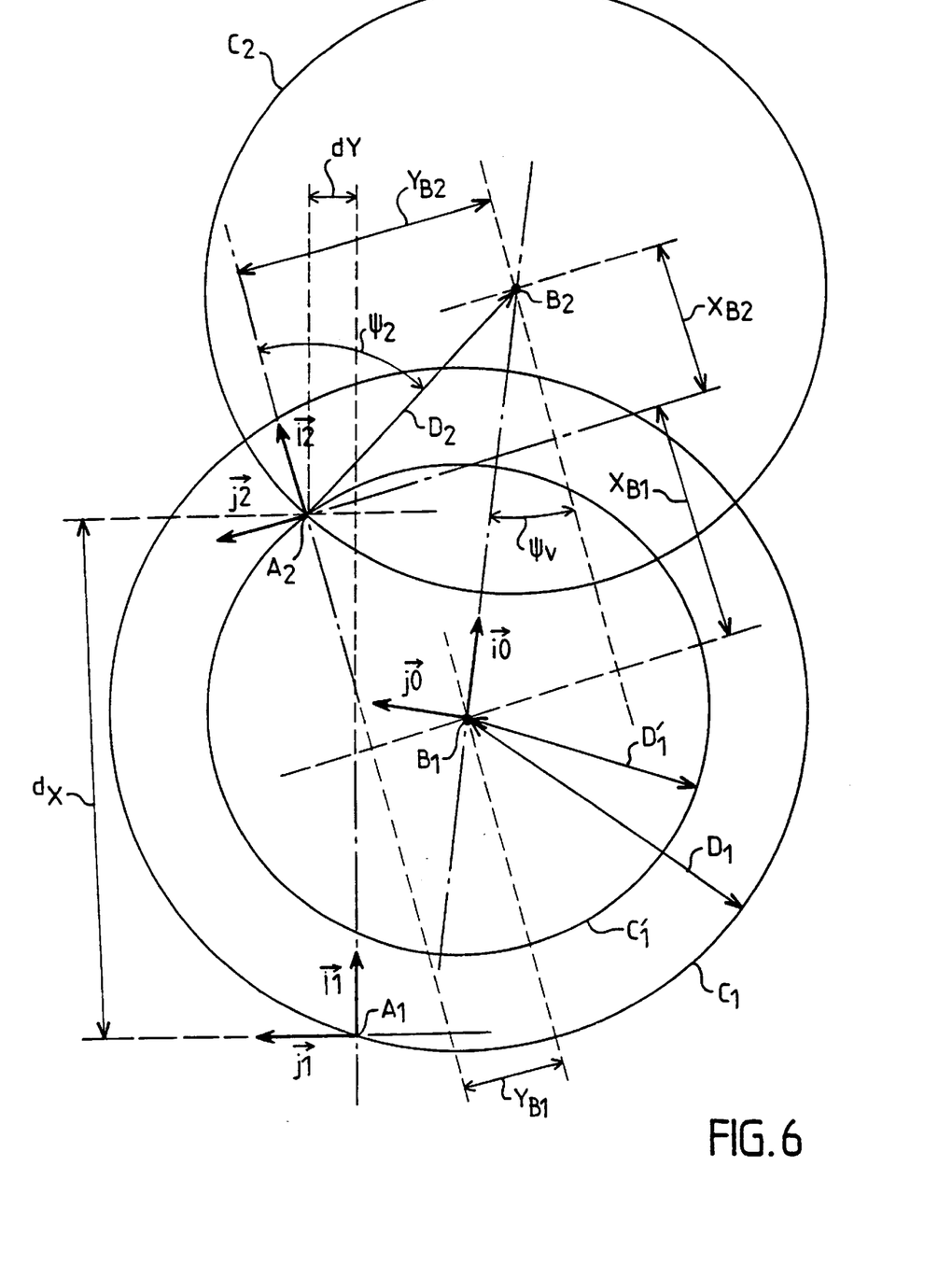
FIG. 6 illustrates a second method of locating the moving body in absolute terms, which is. performed at two given instants with respect to two beacons which can be seen at least in turn according to the invention.

With reference to FIG. 6, absolute location is achieved at two given instants in the movement of the moving body with respect to two beacons which can be seen at least in turn by the linear camera. Absolute location is achieved using a first relative location of the moving body with respect to the beacon B1, calculated at a given instant t1, and a second relative location of the moving body with respect to the beacon B2 calculated at another given instant t2 spaced from the first instant t1 by a few seconds.

At the instant t1, the moving body sees the beacon B1 (position A1). At the instant t2, the moving body sees the beacon B2 (position A2).

The two relative locations are calculated using an approach similar to the one employed for the relative locations described with reference to FIG. 5. The first location makes it possible to obtain the parameters D1 and $\psi_1$. The second location makes it possible to obtain the parameters D2 and $\psi_2$.

In short, the search here is for the absolute coordinates $X_{A2}$, $Y_{A2}$ of the point A2 of the moving body in the frame of reference $R_0$ from the intersection of two circles C'1 and C2 and its heading tan $\psi_V$, as follows:

First of all, 4 study frames of reference $R_0$, $R_1$, $R'_1$, $R_2$ are defined according to formula IX. The frame of reference $R_0$ is associated with the beacon B1. The other frames of reference are associated with the moving body.

The relative locations are then used to determine the distances D1 and D2 respectively separating the point A1 from the beacon B1 and the point A2 from the beacon B2, using the appended formula II.

The moving body is located on the circle C1 centered on B1 and of radius D1. Likewise, the point A2 is located on the circle C2 centered on B2 and of radius D2. The point A2 is also on the circle C'1 centered on B1 and of radius D'1.

The distance D'1 is the distance that separates the point A2 from the beacon B1.

Odometry then needs to be used to calculate the distance D'1 on the basis of the parameters dX, dY and $d_\psi$, using the appended formulae X, XI and XII. In these formulae, dX is the distance separating the points A1 and A2 in the longitudinal direction of travel of the moving body, dY is the distance separating the points A1 and A2 of the moving body in the direction transverse to the movement of the moving body, and $d_\psi$ is the difference between the angular positions $\psi_1$ and $\psi_2$.

Having solved formula XII, the coordinates of the point A2 in the frame of reference $R_0$ are obtained using appended formula XIII.

The heading of the moving body, $\tan\psi_V$, with reference to FIG. 6, is determined using formulae XIV and XV.

Obviously, the calculation of the relative location and/or absolute location can be performed using other formulae.

It was seen earlier that the camera looks at one or more beacons which flash periodically. This flashing makes it possible to eliminate the background noise by taking the difference between two consecutive images, one in which the beacons are illuminated and the other in which the beacons are not illuminated. Thus, the spikes (or bright spots) can be detected far more easily and, above all, far more reliably.

However, a problem of synchronization of the camera and the light beacons may remain. This is because if the camera performs the exposure phase while the light beacons are changing status then the image perceived may be incorrect.

One solution to this problem consists in bringing the camera exposure signal into phase with the beacons' flashing signal.

To perform this synchronization correctly, the frequency at which the beacons flash is chosen to be identical to the acquisition frequency of the lines of the linear camera. An intrinsic frequency shift (different oscillator, temperature) is, however, tolerated.

Next, the phase difference between the two electrical signals has to be regulated. One known solution consists in using electronic means capable of using software to achieve a phase-locked loop also known as PLL. For example, to compensate for phase differences between the camera signals and the beacons' signals, the software solution hinges around modulating the camera acquisition period.

In the case of passive beacons illuminated by a flash, the synchronization means are designed to synchronize the operation of the flash and the operation of the camera.

ANNEX

Formula I:
$$\tan\Psi_1 = \frac{e(V_A e + f d\Psi)}{df\dot{e} + f e V_A - e^2 d\Psi}$$

Formula II:
$$D_1 = \frac{\sqrt{(df\dot{e} + feV_A - e^2 d\Psi)^2 + e^2(V_A e + fd\Psi)^2}}{|f\dot{e} - \Psi(e^2 + f^2)|}$$

-continued

ANNEX

Formula III:
$$\tan\Psi_V = \frac{V_A(e_2^2 \dot{e}_1 - e_1^2 \dot{e}_2) + fd\Psi(e_2 \dot{e}_1 - e_1 \dot{e}_2) + \Psi(e_2 - e_1)[\Psi d(e_1 e_2 - f^2) - V_A f(e_1 + e_2)]}{-df^2\Psi(\dot{e}_2 - \dot{e}_1) + fV_A(e_2 \dot{e}_1 - e_1 \dot{e}_2) + \Psi(e_2 - e_1)[V_A(e_1 e_2 - f^2) + fd\Psi(e_1 + e_2)]}$$

Formula IV:
$$\tan\Psi_V = \frac{D_2 \sin\Psi_2 - D_2 \sin\Psi_1}{D_2 \cos\Psi_2 - D_1 \cos\Psi_1}$$

Formula V:
$$\begin{cases} X_A^2 + Y_A^2 = D_1^2 \\ (X_A - X_{B_2})^2 + Y_A^2 = D_2^2 \end{cases}$$

Formula VI:
$$\begin{cases} X_A = \dfrac{D_1^2 - D_2^2}{2X_{B_2}} + \dfrac{X_{B_2}}{2} \\ Y_A = \sqrt{D_1^2 - \left(\dfrac{D_1^2 - D_2^2}{2X_{B_2}} + \dfrac{X_{B_2}}{2}\right)^2} \end{cases}$$

Formula VII:
$$X_A = \frac{(df\dot{e}_1 + fe_1 V_A - e_1^2 d\Psi)^2 + e_1^2(V_A e_1 + fd\Psi)^2}{2X_{B_2}(f\dot{e}_1 - (e_1^2 + f^2)\Psi)^2} - \frac{(df\dot{e}_2 + fe_2 V_A - e_2^2 d\Psi)^2 + e_2^2(V_A e_2 + fd\Psi)^2}{2X_{B_2}(f\dot{e}_2 - (e_2^2 + f^2)\Psi)^2} + \frac{X_{B_2}}{2}$$

Formula VIII:
$$Y_A = \sqrt{\frac{(df\dot{e}_1 + fe_1 V_A - e_1^2 d\Psi)^2 + e_1^2(V_A e_1 + fd\Psi)^2}{(f\dot{e}_1 - (e_1^2 + f^2)\Psi)^2} - \left(\frac{(df\dot{e}_1 + fe_1 V_A - e_1^2 d\Psi)^2 + e_1^2(V_A e_1 + fd\Psi)^2}{2X_{B_2}(f\dot{e}_1 - (e_1^2 + f^2)\Psi)^2} - \frac{(df\dot{e}_2 + fe_2 V_A - e_2^2 d\Psi)^2 + e_2^2(V_A e_2 + fd\Psi)^2}{2X_{B_2}(f\dot{e}_2 - (e_2^2 + f^2)\Psi)^2} + \frac{X_{B_2}}{2}\right)^2}$$

Formula IX:
$$\begin{cases} R_0 = (B_1, \vec{i}_0, \vec{j}_0) \\ R_1 = (A_1, \vec{i}_1, \vec{j}_1) \\ R'_1 = (A_2, \vec{i}_1, \vec{j}_1) \\ R_2 = (A_2, \vec{i}_2, \vec{j}_2) \end{cases}$$

Formula X:
$$\begin{cases} X_{B_1/R'_1} = X_{B_1/R_1} - dX \\ Y_{B_1/R'_1} = Y_{B_1/R_1} - dY \end{cases}$$

Formula XI:
$$D'_1 = \sqrt{(X_{B_1/R_1} - dX)^2 + (Y_{B_1/R_1} - dY)^2}$$

Formula XII:
$$\begin{cases} C'_1 : X^2 + Y^2 = D'^2_1 \\ C_2 : (X - X_{B_2})^2 + Y^2 = D_2^2 \end{cases}$$

Formula XIII:
$$\begin{cases} X_{A_2} = \dfrac{D'^2_1 - D_2^2}{2X_{B_2}} + \dfrac{X_{B_2}}{2} \\ Y_{A_2} = \sqrt{D'^2_1 - \left(\dfrac{D'^2_1 - D_2^2}{2X_{B_2}} + \dfrac{X_{B_2}}{2}\right)^2} \end{cases}$$

Formula XIV:
$$\begin{cases} X_{B_1/R_2} = (X_{B_1/R_1} - dX)\cos(d\Psi) + (Y_{B_1/R_1} - dY)\sin(d\Psi) \\ Y_{B_1/R_2} = (Y_{B_1/R_1} - dY)\cos(d\Psi) - (X_{B_1/R_1} - dX)\sin(d\Psi) \end{cases}$$

-continued

ANNEX

Formula XV: $\tan\Psi_V = \dfrac{D_2\sin\Psi_2 + Y_{B_1/R_2}}{D_2\cos\Psi_2 - X_{B_1/R_2}}$

What is claimed is:

1. Method for locating a moving body equipped with a camera of the type comprising a linear array of photosensitive elements (CA), aimed in a known direction with respect to reference axes associated with the moving body, image processing means, and means (ODO) for capturing information relating to the movement of the moving body (M), characterized in that it involves the steps consisting in:
   a) distributing in the zone in which the moving body moves, fixed beacons (B1, B2) which are intermittently illuminated either actively and/or passively,
   b) at the moving body (M) and at a chosen rate, taking a pair of different linear images (IL1 and IL2) of the same image field, one of the images being one in which the beacon or beacons are illuminated, the other being one in which the beacon or beacons are not illuminated,
   c) processing the pair of linear images by a point-by-point subtraction of one from the other,
   d) obtaining at least one bright spot (P1) from the subtraction of the two linear images (IL1 and IL2), this spot representing at least one light beacon in the environment, and
   e) calculating, on the basis of information relating to the movement of the moving body, the position (e) of the bright spot (P1) on the linear array, and its derivative, a first item of information relating to the distance (D1) separating the beacon thus represented (B1) and a frame of reference (A) associated with the moving body, and a second item of information relating to an angular position of the beacon with respect to said frame of reference associated with the moving body, thus making it possible, as a function of the first and second items of information thus calculated, to locate the moving body in relative terms with respect to said beacon.

2. Method according to claim 1, characterized in that step e) further comprises locating the moving body in absolute terms with respect to a fixed frame of reference defined using two separate beacons which can be seen simultaneously, said absolute location consisting in calculating, at a given instant, a relative location of the moving body with respect to each beacon, in calculating the heading of the moving body with respect to the two beacons, and in calculating the coordinates of a chosen point of the moving body with respect to said fixed frame of reference associated with the two beacons.

3. Method according to claim 1, characterized in that step e) further comprises locating the moving body in absolute terms with respect to a fixed frame of reference ($R_0$) associated with two beacons which can be seen at least in turn as the moving body moves along (B1, B2), said absolute location consisting in calculating, at a first given instant, a first relative location of the moving body with respect to the first beacon, in calculating, at a second given instant, after the first instant, a second relative location of the moving body with respect to the second beacon which follows the first, in using odometry to calculate the movement of the moving body and the heading of the moving body with respect to said first and second beacons and in calculating the coordinates of a chosen point (A2) of the moving body with respect to said fixed frame of reference ($R_0$).

4. A method according to claim 1, in which a number of beacons (B1, B2, . . . ) are distributed along the roadway (CH) to define a reference path, and the method further comprises a step
   f) which consists in determining said reference path using the relative and/or absolute location of the moving body with respect to said beacons, and in guiding the moving body, keeping a certain distance between the moving body and said reference path.

5. Device for locating a moving body equipped with a camera (CA) of the type comprising a linear array of photosensitive elements aimed in a known direction with respect to reference axes associated with the moving body, image processing means and means (ODO) for capturing information relating to the movement of the moving body,
   characterized in that it comprises fixed beacons which are intermittently illuminated either actively and/or passively, and distributed in the zone in which the moving body moves,
   in that the linear camera (CA) is capable, at a chosen rate, of taking a pair of different linear images (IL1 and IL2) of the same image field, one of the images being one in which the beacon or beacons are illuminated, the other being one in which the beacon or beacons are not illuminated,
   in that the image processing means are capable of processing the pair of linear images to perform a point-by-point subtraction of one from the other and obtaining at least one bright spot (P1) from the subtraction of the two linear images, this spot representing at least one beacon in the environment,
   in that the moving body comprises calculation means capable of calculating, on the basis of information relating to the movement of the moving body, the position (e) of the bright spot (P1) on the linear array, and its derivative, a first item of information relating to the distance (D1) separating the beacon thus represented and a frame of reference (A) associated with the moving body, and a second item of information relating to an angular position of the beacon with respect to said frame of reference associated with the moving body, thus making it possible to locate the moving body in relative terms with respect to said beacon.

6. Device according to claim 5, characterized in that the calculation means are capable of locating the moving body in absolute terms with respect to a fixed frame of reference defined using two separate beacons (B1 and B2) which can be seen simultaneously, said calculation means being capable of calculating, at a given instant, a relative location with respect to each beacon, the heading of the moving body with respect to said beacons (B1 and B2) and the coordinates of a chosen point of the moving body with respect to said fixed frame of reference associated with said two beacons.

7. Device according to claim 5, characterized in that the calculation means are capable of locating the moving body in absolute terms with respect to two beacons which can be seen at least in turn as the moving body moves along, said calculation means being capable of calculating, at a first given instant, a first relative location of the moving body with respect to the first beacon, of calculating, at a second given instant, after the first instant, a second relative location of the moving body with respect to the second beacon which follows the first, of using odometry to calculate the movement of the moving body and the heading of the moving body with respect to said first and second beacons and of calculating the coordinates of a chosen point (A2) of the moving body with respect to said fixed frame of reference ($R_0$).

8. Device according to claim 5, in which a number of beacons are distributed along the roadway (CH) to define a reference path, the device being characterized in that the calculation means are capable of determining said reference path using the relative and/or absolute location of the moving body with respect to said beacons, and of guiding the moving body, keeping a certain distance between the moving body and said reference path.

9. Device according to claim 5, in which the light beacons (B1, B2) are of the retroreflective type, characterized in that the moving body further comprises a flash capable of intermittently passively illuminating said light beacons, the flash and the camera being controlled synchronously.

10. Device according to claim 9, characterized in that the flash (FH) comprises a support (10) aimed in the same direction as the camera, equipped with an opening (12) through which the light radiation passes to reach the camera and on the periphery of which there are a number of light-emitting diodes (EL).

11. Device according to claim 10, characterized in that the support (10) for the flash is of concave overall shape.

12. Device according to claim 9, in which the beacons are passively illuminated, characterized in that the moving body comprises synchronization means capable of bringing the camera acquisition signal into phase with the light signal from the flash.

13. Device according to claim 5, in which the beacons are actively illuminated, characterized in that the moving body comprises synchronization means capable of bringing the camera acquisition signal into phase with the light signal from the beacons.

* * * * *